Dec. 4, 1962 W. A. BARRETT, JR 3,067,408

MAGNETIC MEMORY CIRCUITS

Filed Nov. 4, 1958 3 Sheets-Sheet 1

INVENTOR
W. A. BARRETT, JR.
BY
William H. Kamstra
ATTORNEY

Dec. 4, 1962 W. A. BARRETT, JR 3,067,408

MAGNETIC MEMORY CIRCUITS

Filed Nov. 4, 1958 3 Sheets-Sheet 2

INVENTOR
W. A. BARRETT, JR.
BY
William H. Kamitia
ATTORNEY

Dec. 4, 1962 W. A. BARRETT, JR 3,067,408

MAGNETIC MEMORY CIRCUITS

Filed Nov. 4, 1958 3 Sheets-Sheet 3

INVENTOR
W. A. BARRETT, JR.
BY
William H. Kamstra
ATTORNEY

United States Patent Office 3,067,408

Patented Dec. 4, 1962

3,067,408
MAGNETIC MEMORY CIRCUITS

William A. Barrett, Jr., Madison, N.J., assignor to Bell Telephone Laboratories, Incorporated, New York, N.Y., a corporation of New York Filed Nov. 4, 1958, Ser. No. 771,782
30 Claims. (Cl. 340—174)

This invention relates to magnetic memory devices and more particularly to such devices in which the basic memory element comprises a segment of a magnetic wire.

Magnetic wire memory elements exhibiting substantially rectangular hysteresis characteristics are well known and like their functional predecessors, the toroidal core elements, find extensive applications in almost every field relating to the magnetic switching and information storage and handling arts. A highly advantageous magnetic wire element in which information is stored in the form of particular magnetizations induced in a preferred flux path established in the wire is described, for example, in the copending application of A. H. Bobeck, Serial No. 675,522, filed August 1, 1957. In a manner analogous to that known in connection with toroidal magnetic cores generally, an information bit is stored in an address segment of the preferred flux path of a magnetic wire by inducing a magnetization of a particular direction in that segment. Such a magnetization direction may be representative, for example, of a binary "1." When the character of an information bit stored in an address segment of the wire is to be determined, a sensing magnetomotive force is applied to the wire at that segment. Should, say, a binary "1" be stored in the address segment, the magnetization will be caused to reverse direction thereby generating a voltage indicative of the "1" across the ends of the magnetic wire.

Obviously, a complete reversal of magnetization direction during the sensing or read-out phase of operation destroys the stored binary "1" since the magnetization has been changed in polarity from that representing the "1". This destructive manner of read out is well known in connection with conventional toroidal magnetic core elements and generally requires that circuitry be provided to restore such a destroyed information bit immediately after read out if more permanent storage is necessary. A similar problem is encountered when an information bit is read from some types of magnetic wire memory elements.

Accordingly, an object of this invention is the provision of nondestructive read-out means in magnetic wire memory elements.

Another object of this invention is a new and novel magnetic information storage cell.

Still another object of this invention is a magnetic memory matrix employing a new and novel magnetic storage element as a basic memory cell and having the advantage of nondestructive read out.

A further object of this invention is to provide a magnetic switching element which is advantageously adapted for gating and control functions in information handling systems.

It is also an object of this invention to provide a new and novel crosspoint matrix switch.

The foregoing and other objects are realized in one specific illustrative embodiment of this invention comprising a pair of magnetic wires which may be of the character described in the aforementioned copending application. One of the wires, in addition to substantially rectangular hysteresis characteristics, has high magnetic coercive force properties and the other has relaitvely lower magnetic coercive force properties. Additionally, the higher coercive force wire advantageously though not necessarily has a relatively higher remanent flux than the lower coercive force wire. The wires are placed parallelly adjacent or twisted together, or in a like manner arranged in close proximity so that a magnetic coupling may be achieved between the two. An information bit is introduced in an address segment of the wire having the higher coercive force by applying coincident currents to the latter wire and to a winding coupled to both of the wires at the address segment. As a result, the information bit will be represented in the higher coercive force wire as a primary magnetization of a particular direction at the address segment. According to the principles of this invention the flux will be closed in the reverse direction partially through an adjacent segment of the low coercive force wire which, as a result, will have a slave magnetization of the opposite direction induced therein. The remanent magnetic properties of the higher coercive force wire as manifested in its substantially rectangular hysteresis characteristics now provide for the permanent storage of the information bit which bit may subsequently be read out when necessary.

The character of the information bit so stored is read by applying a sensing current only to the winding also used for coincident current writing. The magnitude and polarity of the sensing current are such that the slave magnetization only in the low coercive force wire segment is reversed. This reversal causes an output voltage to be generated across the ends of the low coercive force wire which voltage is indicative of the information bit stored. In the conventional toroidal core read-out manner, the binary values are distinguished in the output voltage signals by the difference in amplitude caused by the complete excursion of the flux from one remanent point on a hysteresis loop of the wire material to the other and a partial or "shuttle" excursion indicating that the wire segment has not been reversed in polarity.

When the sensing current is removed and read out has been completed, the field of the primary magnetization originally induced in the high coercive force wire segment representative of the permanently stored information bit restores the slave magnetization to its complementary magnetization state. Obviously, neither during nor as a result of the read-out operation has the primary magnetization representative of the information bit stored been caused permanently to change direction. The only significant magnetic change that has taken place is that in the slave magnetization which, as described above, is restored to its complementary magnetic state without the employment of external circuitry or additional power expenditure.

In accordance with an alternative mode of operation, the field of the primary magnetization is insufficient alone to induce or reverse a magnetization in the adjoining conductor. In this mode a resetting field is applied to maintain the slave magnetization and the field of the primary magnetization is utilized to either augment or oppose a read field applied to the slave magnetization depending upon the particular binary value stored. The nondestructive aspect of the latter mode of operation is demonstrated in the permanence of the binary value as represented by the primary magnetization. Whichever of the latter operating conditions that prevails then will determine the wave form of an output voltage generated by the switching slave magnetization.

The principles of this invention in either mode of operation thus generally described may advantageously be embodied in coordinate array arrangements. Thus, a magnetic crosspoint switching arrangement or, involving a similar structural configuration, a coordinate array memory matrix may be achieved. Illustrative embodiments of both of such circuits will be described in connection with a more detailed consideration of this invention hereinafter.

Specifically, it is a feature of this invention that a pair of magnetic wires having different magnetic coercive force properties and saturation fluxes are magnetically coupled to achieve a magnetic memory element.

It is another feature of this invention that a magnetization representative of an information bit in an address segment of a magnetic wire memory element having a high coercive force induces a slave magnetization in an associated auxiliary wire element having a low coercive force.

Still another feature of this invention is a means for operating upon a slave magnetization induced in an auxiliary wire element by a magnetization representative of an information bit in a main wire memory element in order to sense the bit without magnetically altering the main wire memory element.

A further feature of this invention is the association of a pair of magnetic wire memory elements having coercive forces and remanent fluxes such that the field of a magnetization induced in one wire element will cause a slave magnetization in the other without a corresponding reciprocal effect by the field of a magnetization induced in the latter wire element.

Yet another feature of this invention is the association of a pair of magnetic wires having different coercive forces such that flux reversal in the wire having the lower coercive force is controlled by the polarity of a remanent flux in the wire having the higher coercive force.

The foregoing and other objects and features of this invention will be better understood from a consideration of the detailed description thereof which follows when taken in conjunction with the accompanying drawing in which.

Figure 1:
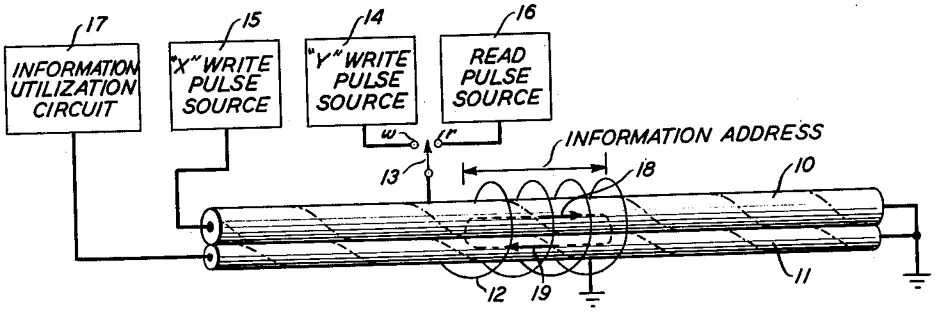
FIG. 1 depicts one illustrative memory element according to the principles of this invention.

One specific illustrative embodiment of a memory element according to this invention shown in FIG. 1 of the drawing comprises a first and a second electrical conductor 10 and 11, respectively, disposed longitudinally parallel and in close proximity to each other. Each of the conductors 10 and 11, in this embodiment, is of a magnetic material in which a preferred helical flux path has been established either by subjecting the conductors to an actual torsional stress by means not shown in the drawing or by processing during the formation of the conductor. The principles involved and other methods of achieving such helical paths are described in detail in the copending Bobeck application previously cited herein. In addition, the helical flux path component engendered in the conductor 10 has substantially rectangular hysteresis characteristics. Since such rectangularity in the hysteresis characteristic loop is frequently advantageously achieved by the process of establishing the helical flux component in the conductors, the helical path of the conductor 11 may also have rectangular hysteresis properties. However, the latter properties in the conductor 11 are not a necessary condition for the operation of this embodiment of the invention, it being sufficient that the flux path of the conductor 11 display a nonlinearity in its hysteresis loop.

The conductors 10 and 11 are also distinguishable in their respective coercive forces and remanent fluxes. Thus, the conductor 10 has a substantially higher coercive force than that of the conductor 11; a coercive force for the conductor 10 of from three to five times the oersteds of the force for the conductor 11, for example, has been found suitable. The remanent flux of the conductor 10 is advantageously greater than that of the conductor 11 and this difference may be of the order of ten to one. Thus, although the conductors 10 and 11 are shown in FIG. 1 as having different diameters to emphasize the disparity in remanent flux, by the suitable selection of magnetic materials this difference in flux capacity may readily be achieved by conductors of the same dimensions.

Inductively coupled to both of the conductors 10 and 11 is a winding 12 which may advantageously be wound about both of the conductors as shown in FIG. 1. The relative dimensions of the conductors 10 and 11 together with those of the winding 12 have been exaggerated in FIG. 1 for purposes of description. One side of the winding 12 as well as one side of each of the conductors 10 and 11 is connected to ground. The other side of the winding 12 is connected to a switching means 13 having a pair of positions *w* and *r*. Connected to the *w* position is a "*y*" source of coincident write current pulses 14 and connected to the other side of the conductor 10 is an "*x*" source of coincident write current pulses 15. A read current pulse source 16 is connected to the *r* position of the switching means 13 and an information utilization circuit 17 is connected to the other side of the conductor 11. The current sources 14, 15, and 16 may advantageously comprise conventional current sources well known and devisable by one skilled in the art, capable of producing current pulses and controllable in the manner to be described in detail hereinafter. Similarly, the character of the information utilization circuit 17 will be determined by the particular system application of the memory element of this invention. Since such circuits as the foregoing are known elements of the combination of this invention, they need not be described herein in detail. The switching means 13 may also comprise any of the well-known means available for performing the function to be described at the times required.

When an information bit, say a binary "1," is to be introduced into the memory element of FIG. 1, coincident currents are applied during the write phase to generate the necessary magnetomotive forces. Thus, an "*x*" write current pulse of proper polarity is applied to the conductor 10 from the source 15. Coincidently therewith, with the switching means 13 in the *w* position, a "*y*" write current pulse also of proper polarity is applied to the solenoid winding 12 from the source 14. The "*x*" and "*y*" write current pulses each are of a magnitude to be insufficient alone to produce a permanent change in the magnetic condition of the conductors 10 or 11. However, in the conventional coincident current switching manner, when added together, a sufficient magnetomotive force is produced to effect the desired flux switching action. The resultant field caused by the transverse and longitudinal field components produced by the "*x*" and "*y*" current pulses, respectively, as a result, induces a remanent magnetization of a particular and same direction in adjoining segments of the helical flux paths of each of the conductors 10 and 11 indicated in FIG. 1 as the information address. As will appear hereinafter, no practical upper limits need be considered for the total effective write current, as long as the partial write currents added each remain insufficient to cause permanent flux switching.

Upon the termination of the coincident write currents the magnetization representative of a binary "1" at the information address of the conductor 10 will remain due to its remanent properties in accordance with well-known magnetic storage principles. The resultant field of the magnetization at the information address of the conductor 10 due to the flux closure from the ends of the information address will be counter to that of the field of the magnetization also induced at the information address in the conductor 11. Since both the coercive force and remanent flux of the conductor 10 are sufficiently higher than those of the conductor 11 and since the conductors 10 and 11 are in magnetic proximity, the field of the magnetization of the conductor 10 will be sufficient to reverse the initial magnetization induced in the conductor 11 by the write current pulses over the opposing field of the initial magnetization. As a result, a slave magnetization of an opposite direction, also representative of the binary "1," will be left at the information address of conductor 11. This condition is symbolized in FIG. 1 by the arrow 18, which represents the primary magnetization in the conductor 10, and the arrow 19, which represents the slave magnetization in the conductor 11.

A binary "0" is written into the information address of the embodiment of FIG. 1 in a manner identical to that described above for the introduction of a binary "1" with the exception that the polarity of the "*x*" and "*y*" write current pulses is reversed. The arrows 18 and 19, symbolizing the representative magnetizations, would, in the case of a binary "0," thus be reversed.

The binary information value contained in the information address is sensed by the application of a read current pulse of suitable polarity and magnitude from the source 16 only to the winding 12. The switching means 13 is in this case moved to the *r* position for the read phase of operation. Assuming that the polarity of the read current pulse is the same as that necessary to introduce a binary "1" into the information address, the field generated by the latter read current pulse in the winding 12 will be of a direction such as to augment the primary magnetization in the conductor 10. However, the read field will oppose the slave magnetization in the conductor 11. As a result, the latter magnetization will be caused to reverse. The reversal of the slave magnetization generates a voltage across the ends of the conductor 11 in a manner now known in connection with the conductor-memory elements contemplated herein. This output voltage signal produced by the reversal of the slave magnetization will be representative in magnitude of the binary information bit stored as a primary magnetization in the conductor 10 and will be transmitted to the utilization circuit 17. Upon the termination of the read current pulse, due to the difference in coercive force and saturation flux of the conductors 10 and 11, the field of the undisturbed primary magnetization in the information address of the conductor 10 will be effective again to restore the slave magnetization to its information representative direction. This restoration takes place without the application or expenditure of external power or accessory circuitry in the embodiment being described. The binary "1," described for exemplary purposes as being contained in the information address of conductor 10, has thus been sensed without being destroyed or otherwise magnetically disturbed.

In the case of the foregoing read out of a binary "1," obviously no upper limits appear with respect to the magnitude of the read current pulse. Since the field developed by the read current is in the same direction as that of the primary magnetization in conductor 10, a large read current in this case will have no detrimental effect. However, as previously described, a binary "0" will be represented in the conductor 10 and conductor 11 as magnetizations of the opposite direction. Sensing is again accomplished by applying from the source 16 the read current pulse to the winding 12 of a polarity as described for the sensing of a binary "1." In this case, however, the read field will oppose that of the primary magnetization in the conductor 10 and will be in the same direction as that of the slave magnetization in the conductor 11. Accordingly, it is readily understood that if the read current pulse now is of a magnitude sufficient to reverse the primary magnetization in the conductor 10 the information bit will be destroyed and that to no purpose. The read current pulse from the source 16 is, as a result, maintained at a level sufficient to effect a switching of the slave magnetization when the character of the stored information bit so determines without disturbing the primary magnetization in conductor 10.

Obviously, the conductors 10 and 11 may be of any cross-sectional form whatever and any of the structures suggested as a basic memory element in the copending Bobeck application mentioned hereinbefore may be employed to practice the principles of this invention. The actual physical dimensions of the elements of a memory element according to this invention, however, will be determined by a number of factors including the material used, bit or information address length, and the like.

The foregoing description of the embodiment of this invention depicted in FIG. 1 contemplates the employment of a conductor 10 which is of a material having a magnetization such that its field will be strong enough to induce an opposite magnetization in the adjoining conductor 11. In some applications, however, it may become advantageous to use a material for the conductor 10 which has a magnetization less than that sufficient to effect such an induction. In such a case, the principles of this invention may still be applied to achieve a permanent information store represented by a permanent primary magnetization. The field of the primary magnetization in this alternative mode of operation, although insufficient to induce a slave magnetization in the adjoining conductor 11, would still be effective to influence switching fields applied to the latter conductor. In this mode, the write phase is accomplished in a manner identical to that described previously herein for either a binary "1" or a binary "0." Since the primary magnetization may be insufficient to induce a slave magnetization at the information address in conductor 11, the latter is induced by a bias or reset current which may advantageously be supplied from the read current source 16 modified for this purpose or the bias current may be supplied by a separate source not shown in the drawing. The bias or reset current is of the same polarity for either binary value although opposite in polarity to that of the read current. Consequently, the slave magnetization will oppose the field of the primary magnetization for one value and will augment the latter field for the other binary value.

The sensing of a bit in an information address in the latter mode of operation is also accomplished by switching the slave magnetization, again without magnetically disturbing the primary magnetization in the conductor 10. Here, however, since the bias current maintains the slave magnetization in the same direction for either binary value, a switching of the slave magnetization occurs for either value stored in the address. The field of the primary magnetization of one binary value, however, will oppose the switching or read field while it will augment the read field for the other binary value. The signal voltage developed across conductor 11 by the switching of the slave magnetization in this mode of operation will vary in wave form as determined by the agreement or opposition of the read field and the field of the primary magnetization as they both operate upon the field of the slave magnetization. Upon the termination of the read current pulse the bias or reset current, which may be continuously applied or comprise timed current pulses, will restore or reset the slave magnetization to its normal direction, again without magnetically disturbing the primary magnetization. The immediately foregoing mode of operation will be described in greater detail hereinafter in connection with a detailed description of the specific illustrative embodiment of this invention shown in FIG. 4 with reference to the magnetic polarities and wave form chart of FIG. 5.

Figure 2:
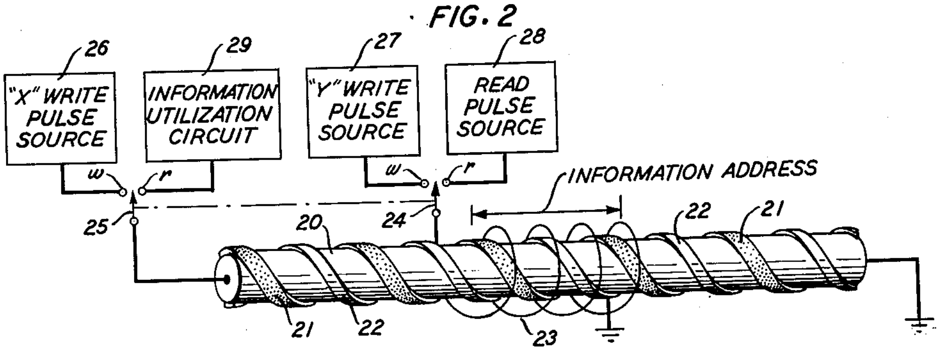
FIG. 2 depicts another illustrative memory element according to this invention.

The flexibility of the present invention is demonstrated in the illustrative embodiment thereof depicted in FIG. 2. In this embodiment a single, insulated electrical conductor 20 has wound therearound in a helical fashion a magnetic component 21 which may comprise a magnetic wire or tape or the like. The helical component 21 is of a material displaying substantially rectangular hysteresis characteristics and has a relatively high coercive force and saturation flux. The conductor 20 together with its magnetic component 21 thus far described is seen to be the structural and functional equivalent of the conductor 10 of the embodiment of FIG. 1 as fully discussed in the copending application of A. H. Bobeck, Serial No. 675,522, filed August 1, 1957, previously referred to herein. In addition to the component 21, a second magnetic component 22 is also helically wound around the conductor 20 alternately with the component 21. The pitch of the two helical components 21 and 22 may conveniently be the same although this need not necesarily be the case. The relationship of the magnetic properties of the magnetic components 21 and 22 is the same as that between the conductors 10 and 11 of the embodiment of FIG. 1. Thus, the component 22 has a relatively low coercive force and a relatively low remanent flux as compared to that of the component 21. For purpose of describing the illustrative memory element depicted in FIG. 2, only a single information address will be assumed to be defined thereon.

Defining an information address on the conductor 20 and its magnetic components 21 and 22 is a coupled winding 23, one end of which, as one end of the conductor 20, is connected to ground. The other ends of the winding 23 and the conductor 20 are connected, respectively, to a pair of ganged wipers 24 and 25 of a two-position switch having a pair of *w* and a pair of *r* contacts. "*x*" and "*y*" write current pulse sources 26 and 27 are connected to the *w* contacts contacted by the wipers 25 and 24, respectively. A read current pulse source 28 is connected to the *r* contact contacted by the wiper 24 and an information utilization circuit 29 is connected to the *r* contact contacted by the wiper 25. It is thus obvious from an inspection of FIG. 2 that the common conductor 20 is connected to an input circuit and an output circuit during the respective write and read phases of operation. Both the conductor 20 and the winding 23 thus serve a dual function; each is used for both the write and the read operations. The elements of the embodiment of FIG. 2 are also shown in exaggerated dimensions and relationships for purposes of description. The circuits 26 through 29 may be identical in character to the circuits 14 through 17 described only in general terms in connection with the embodiment of FIG. 1 and accordingly also need not be described in detail at this point. Similarly, the switching means controlling the ganged wipers 24 and 25 may be any of the well-known means capable of performing the switching function to be described.

The introduction of an information bit in the information address of the conductor 20 is accomplished in a manner identical to that described in detail above for the embodiment of FIG. 1. With the wipers 25 and 24 in the *w* position, coincident write currents from the "*x*" and "*y*" sources 26 and 27, respectively, induce a primary magnetization in the helical component 21 at the information address. The field of the primary magnetization again induces a slave magnetization in the component 22 which latter magnetization may be sensed by an applied read field. The latter field is generated with the wipers 24 and 25 at the *r* positions when a read current pulse is applied from the source 28. Depending upon the particular binary value being stored, a possible switching of the slave magnetization in the component 22 will occur as a consequence of the applied read field. In the embodiment of FIG. 2, however, the output signal voltage representative of the stored information value will be generated in the common conductor 20 and then transmitted to the utilization circuit 29 via the wiper 25. When the read current pulse is terminated, the field of the primary magnetization again restores the slave magnetization to its normal polarity without the application of accessory circuitry or external power expenditure.

The embodiment of FIG. 2 is the functional equivalent of the embodiment of FIG. 1 with the added advantage rising from its differing structure that a common conductor may be used for both helical magnetic components. Thus, the second mode of operation in which a resetting current is used to augment the field of the primary magnetization as described in connection with the embodiment of FIG. 1 may also be practiced in connection with the present embodiment.

Other structural arrangements which comprise functional equivalents of the conductors elements so far described are also to be understood as falling within the scope of this invention. Thus, for example, the conductors 10 and 11 of FIG. 1 may be twisted together or the conductor 10 may have its adjoining conductor 11 coupled thereto in the form of a helical component in the manner of the component 22 of the embodiment of FIG. 2. The latter option, for example, is the one employed and to be described in detail in connection with the illustrative embodiment of FIG. 4 hereinafter.

As has been described in the foregoing, either of the two embodiments of FIGS. 1 and 2, in either the primary or alternative mode of operation, has particular utility in the role of a memory element capable of storing binary information. However, in either embodiment or mode of operation, a gating or control function may also advantageously be accomplished. Thus, for example, with reference to FIG. 1, it is apparent that an output will be received for transmission to the circuit 17 when an input is applied to the winding 12 from the source 16 only when the information address is in a "1" magnetic condition. In the latter condition a path between the components 16 and 17 may be understood as being closed. Further, such a path will continue to exist no matter how often an input is applied because of the nondestructive character of the "1" condition. This application of the principles of the invention is illustrated in an exemplary matrix switch depicted in FIG. 3.

Figure 3:
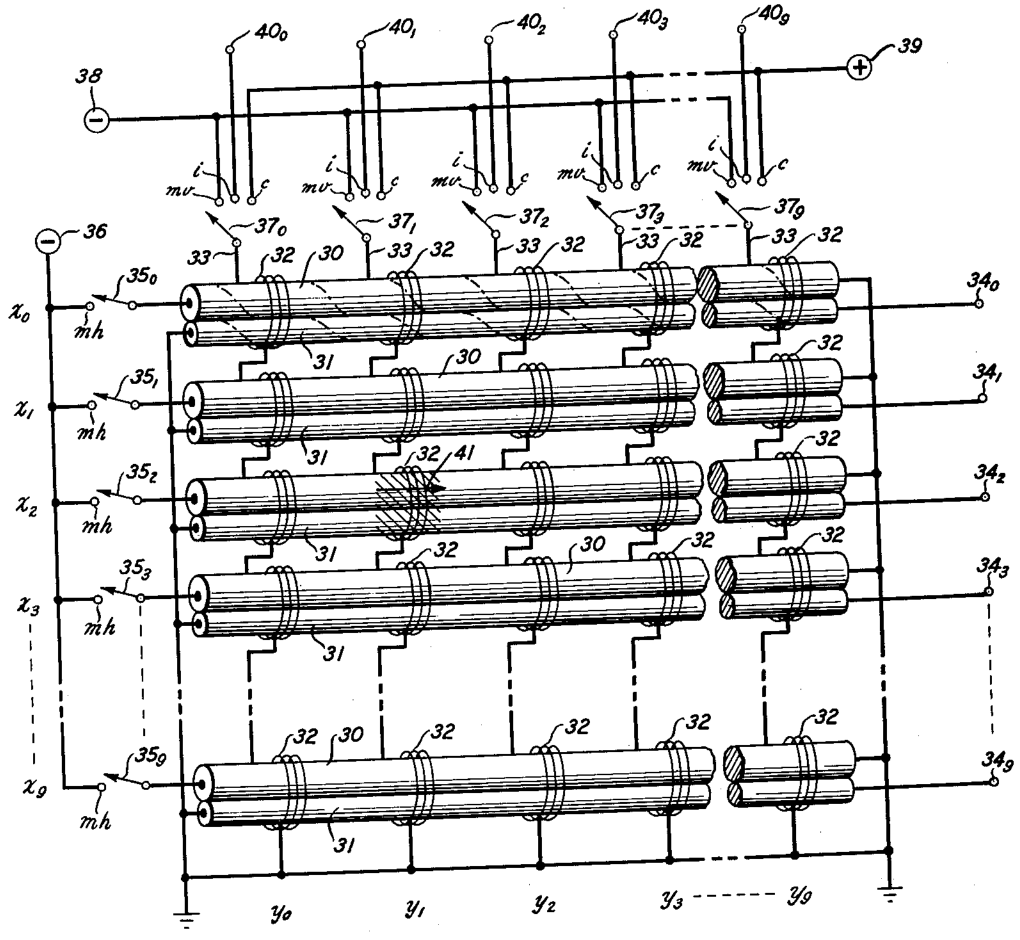
FIG. 3 is a schematic representation of an exemplary crosspoint switching arrangement embodying the principles of this invention.

The particular illustrative structural form comprising the basic element of the matrix switch of FIG. 3 is that specifically described in connection with the embodiment of FIG. 1. Thus, the switch of FIG. 3, which may for illustration present a ten-by-ten array, comprises the magnetic conductors 30 each having magnetically coupled thereto a magnetic conductor 31. Since the conductor pairs 30—31 have the same magnetic properties and characteristics and are related in a manner identical to that of the conductors 10 and 11, respectively, of the embodiment of FIG. 1, the description of these aspects need not be repeated here. A plurality of windings 32 inductively coupled to each of the conductor pairs 30—31 define a plurality of crosspoints of the switch. Corresponding windings 32 of each of the conductor pairs 30—31 are serially connected by circuits 33 thus arranging the windings 32 and the defined crosspoints in rows and columns. Each of the conductors 30 and 31 as well as the circuits 33 is grounded at one end and each of the conductors 31 is connected at the other end to an output terminal 34.

Thus, the terminals $34_0$ through $34_9$ comprise the outputs at which signal voltages will be selectively available. Each of the conductors 30 is connected at the other end to a switch 35 having a single marking contact *mh* connected to a common source of negative battery 36. Thus, the conductors 30 having defined thereon the rows of crosspoints $x_0$ through $x_9$ are connected respectively to the switches $35_0$ through $35_9$. Each of the circuits 33 is connected at its other end to a three-position switch 37, the circuits 33 defining the columns of crosspoints $y_0$ through $y_9$ accordingly being connected to the switches $37_0$ through $37_9$, respectively. A marking contact *mv* of each of the switches 37 is connected to a common source of negative battery 38 and a clearing contact *c* of each of the switches 37 is connected to a common source of positive battery 39. An input third contact *i* of each of the switches 37 is connected to an input terminal 40. The terminals $40_0$ through $40_9$, connected respectively to the *i* contacts of the switches $37_0$ through $37_9$ provide the means whereby input signals may be selectively applied to the matrix switch embodiment of this invention.

Initially it will be assumed that the crosspoint segments of each of the helical flux paths of the row conductors 30 are magnetized in the same direction. For purposes of description this direction may be understood as a "0" direction in binary terminology and in a left hand direction as viewed in FIG. 3 of the drawing. To close a signal path between an input terminal 40 and an output terminal 34, one of the crosspoints defined by an *x* row and *y* column is marked. Thus, specifically, if a signal path between the input terminal $40_1$ and the output terminal $34_2$ is desired, the crosspoint defined by the winding 32 of the row $x_2$ and column $y_1$ is energized. The row switch $35_2$ is accordingly moved to its marking contact *mh* and the column switch $37_1$ is moved to its marking contact *mv*. Energizing circuits from the negative battery sources 36 and 38 to ground are closed as a result. The resultant magnetomotive force so developed switches the magnetization of the crosspoint defined by the coordinately applied energizing currents to a "1" magnetic direction as symbolized in the drawing by the arrow 41 on a shaded crosspoint. The marking means shown as comprising the row and column switches 35 and 37, respectively, may obviously comprise any well-known marker means capable of accomplishing the selective marking of rows and columns of a matrix switch.

When the selected crosspoint has been marked, the row switch $35_2$ is opened and the column switch $37_1$ is moved to its input contact *i* preparatory to the application of an input signal to the input terminal $40_1$. At this point other signal paths may be set up by marking other crosspoints at other rows and columns without interfering with the path already established. An input signal of a negative polarity such as to switch the magnetization at the selected crosspoint segment of the conductor 31 of row $x_2$ may now be applied to the input terminal $40_1$. Upon the switching of the latter magnetization an output signal will be generated across the ends of that conductor 31 in accordance with the principles of this invention specifically described hereinbefore.

Advantageously, in accordance with the nondestructive aspect of this invention, once a signal path has been "closed" at a crosspoint, further signals may also be applied to the defining column terminal since once a crosspoint has been marked or set it will remain in this condition until a resetting or clearing current pulse is applied. It is evident that in the embodiment presently being described, an input signal of only one polarity may be transmitted to an output terminal. That is, the input signal must be of a polarity such as to switch the magnetizations at the crosspoints of the conductors 31. If input signals of the opposite polarity are to be transmitted, this may be accomplished by reversing the normal direction of magnetization of the conductors 30 at the crosspoints. Battery sources 36 and 38 in this case would also be reversed in polarity.

The clearing of the matrix switch of FIG. 3 is readily accomplished by applying resetting currents of proper polarity and magnitude to either the column circuits 33 or the row conductors 30. This obviously may be accomplished from either the input or output sides without bringing into use the marker circuitry symbolized in this embodiment by the switches 35 and 37 and their contacts *mh* and *mv*, respectively. In the present embodiment, the switches 37 are moved to the *c* contact positions whereupon a positive potential is connected to the circuits 33 from the source 39. As a result, a resetting or clearing current in the windings 32 restores the marked crosspoints to the normal magnetizations, that is, to a direction opposite to that indicated by the arrow 41. The matrix switch is now ready for the preparation of further signal paths from the input terminals 40 to the output terminals 34.

Figure 4:
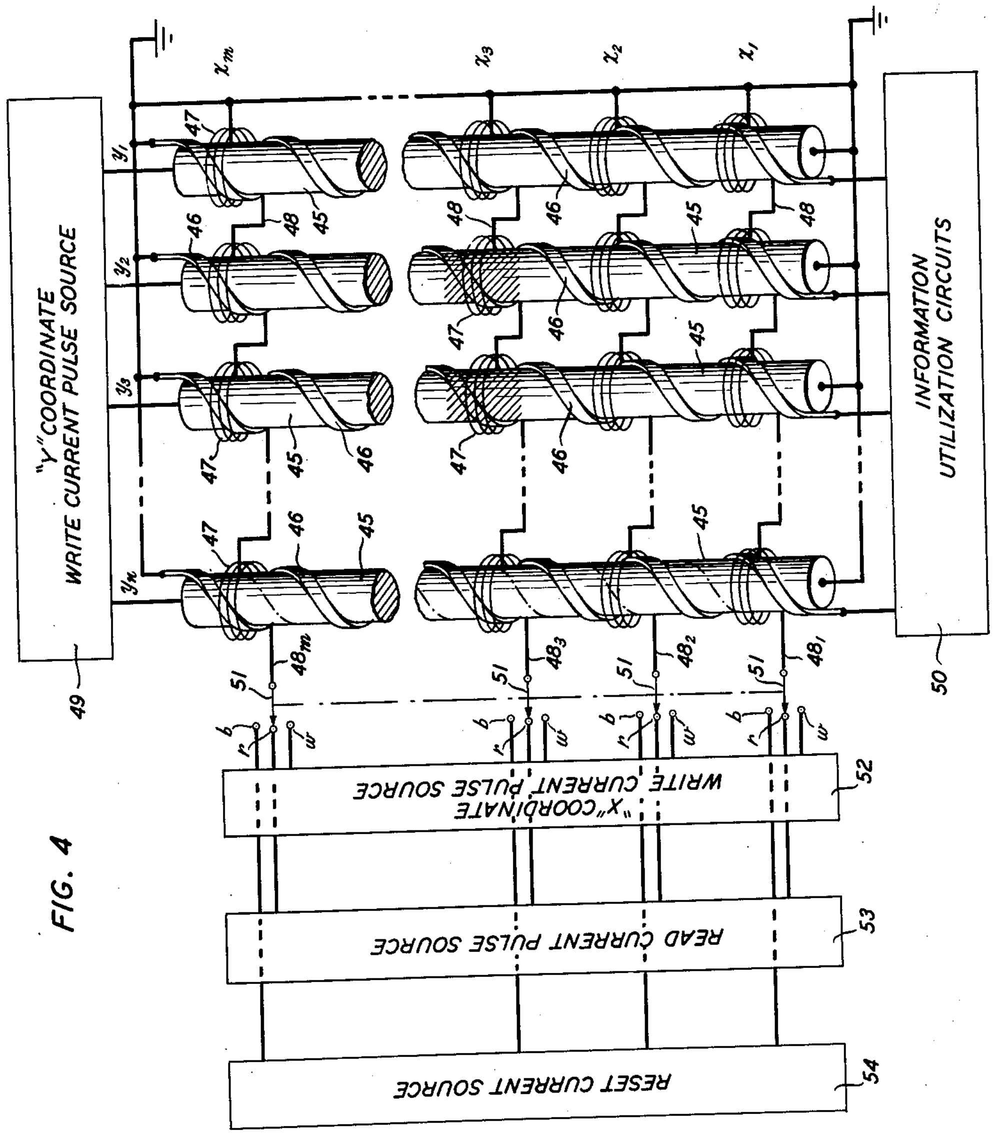
FIG. 4 shows the principles of this invention embodied in an illustrative, word-organized memory matrix.

The coordinate arrangement of this invention described in the immediately foregoing to realize a matrix switch may also be applied to achieve a coordinate array memory matrix. An illustrative example of the latter arrangement is shown in FIG. 4. In the memory matrix there shown a plurality of magnetic conductors 45 are parallelly arranged to present *n* columns of the array. Each of the conductors 45 comprises the equivalent structure of the conductors 10 of the embodiment of FIG. 1. Thus, each of the conductors 45 is of a magnetic material in which a preferred helical flux path has been established by means or processes not shown. A helical flux path exhibiting substantially rectangular hysteresis characteristics is thus available in each of the conductors 45. Helically wound about each of the conductors 45 is a magnetic element 46 which may be either a wire or tape or the like. The conductors 45 and wound elements 46 bear the same relationship as to coercivity and remanent flux as do the corresponding elements 10 and 11, respectively, of the embodiment of FIG. 1. The conductors 45 and elements 46 thus present still another specific structural form according to the principles of this invention which comprises a structure advantageously combining features of the structural forms of both FIGS. 1 and 2. However, it is to be understood that the principles of operation are the same as those described hereinbefore for other embodiments of this invention.

A plurality of windings 47 inductively coupled to each of the conductors and elements 45 and 46 define thereon a plurality of information addresses. Corresponding windings 47 of each of the columns $y_1$ through $y_n$ are serially connected by circuits 48. The windings 47 and the defined information addresses are thus arranged in rows *x* and columns *y*. Each of the conductors 45 and wound elements 46 as well as each of the circuits 48 is connected at one end to ground. The conductors 45 are each connected at the other end to respective terminals of a *y* coordinate write current pulse source 49. The wound magnetic elements 46 are connected at the other end to the respective terminals of an information utilization circuit 50. The circuits 48 are each connected at the other end to a wiper of a three position ganged switching means 51. The wipers of the switching means 51 connect the circuits $48_1$ through $48_m$ via the contact positions *w* to the respective terminals of an *x* coordinate write current pulse source 52. Connected to each of the contact positions *r* of the switch 51 is a read current pulse source 53, and a bias or reset current source 54 is connected to each of third contact positions *b* of the switch 51. Thus, depending on the position of the ganged wipers of the switch 51, the row circuits 48 may be connected to various current sources at different operative stages. The current pulse sources 49 and 52 may be of any suitable type well known in the art capable of providing suitably timed coincident current pulses of a polarity and magnitude for accomplishing the magnetization switching function to be described. The read current pulse source 53 may also comprise well-known circuitry to provide required read current pulses. The illustrative memory matrix of FIG. 4 is organized on a binary word basis, accordingly the source 53 provides the read current in each row for reading out an entire word of binary characters.

Similarly, the information utilization circuit 50 and reset current source 54 may also conveniently comprise well-known circuits capable of operating in a manner to be described. The switching means symbolized by the three position switch 51 may also comprise other known arrangements for performing the switching function.

The memory matrix of FIG. 4 has been arranged for illustrative purposes in accordance with the alternative mode of operation described in connection with the embodiment of FIG. 1. It will be recalled that this mode of operation contemplated the employment of a conductor memory element carrying the primary magnetization which was of a material having a magnetization less than the magnitude sufficient to induce a slave magnetization in the adjoining magnetic element. In describing the alternative mode of operation in connection with the memory matrix of FIG. 4, reference will be had to the polarity direction and output wave form chart of FIG. 5.

An initial magnetic condition of each of the information addresses may be assumed either as one in which no information has been previously stored or as one representative of a binary "1" or a binary "0." For purpose of illustration it will be further assumed that a binary word having the bits 0 . . . 1, 1, 0 is to be written in the row $x_3$ of the matrix. The information addresses of row $x_3$ to contain the binary "1's" have been shaded in the drawing for clarity. To write the foregoing exemplary word, partial magnitude write currents are applied in the conventional coincident current manner from the write current sources 49 and 52. However, as will become apparent hereinafter, in the present word organized array, since read out does not destroy the primary magnetizations representative of stored information, two phases of operation are necessary to write the two possible binary bits of the word. For the write "1" phase $\Phi_1$ a negative partial current pulse is applied to the circuit $48_3$ through the contact $w$ of the switch 51 which switch has been moved to that position preparatory to the write operation. Coincidentally with the application of the pulse from the source 52 to the circuit $48_3$, substantially similar current pulses are applied to each of the conductors 45 of the columns $y_2$ and $y_3$ from the source 49. As a consequence, remanent magnetizations which may be regarded as upward as viewed in the drawing are established in the shaded information addresses. These magnetizations are graphically represented by the arrow $d$ in FIG. 5 of the drawing. Since the write currents applied to other rows and columns as a result of the write operation are only partial, no other information addresses partially defined by those rows or columns are permanently magnetically affected. To write the binary "0's" in the remaining addresses of the word row $x_3$, positive current pulses are applied from the same sources 49 and 52 during the write "0" phase $\Phi_2$ of operation. A positive write current pulse is applied from the source 52 to the circuit $48_3$ coincidentally with a substantially similar positive write current pulse from the source 49 to each of the conductors 45 of the columns $y_1$ and $y_n$. The sources 49 and 52 may thus be additionally specified as being capable of providing either positive or negative controlled current pulses. The remanent magnetization so induced at the defined information addresses of the conductors 45 may be regarded as downward as viewed in the drawing and as represented by the arrow $d'$ in FIG. 5. The write current pulses corresponding to the magnetizations $d$ and $d'$ are also symbolized in the drawing.

Figure 5:
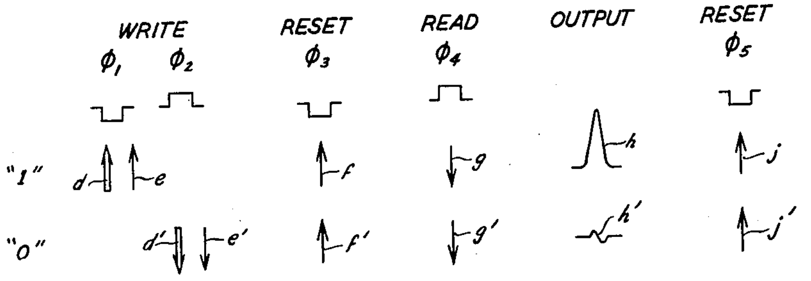
FIG. 5 is a graphic representation showing a comparison of the magnetization polarities and output signals present at different operational phases of the embodiment of FIG. 4.

It will be recalled that the magnetization of the conductors 45 in this embodiment is insufficient to induce a slave magnetization in the coupled elements 46. Accordingly, remanent slave magnetizations of the same direction as the primary magnetizations will be induced in the information addresses of the latter elements by the write current pulses. These are represented in FIG. 5 by the arrows $e$ and $e'$ for a binary "1" and "0," respectively. A reset phase $\Phi_3$, prepared by moving the switch 51 to its $b$ contact position, is initiated by applying a negative current from the source 54 to the circuit $48_3$. The latter is of a magnitude insufficient to switch the primary magnetization representative of a binary "0" and is obviously of a direction to leave a magnetization representative of a binary "1" undisturbed. The remanent slave magnetizations left in the elements 46 by the reset current are represented in FIG. 5 by the arrows $f$ and $f'$. Thus, with respect to the binary "0's" in the information addresses, primary magnetizations will be present in the conductors 45 which have oppositely directed slave magnetizations in the magnetic elements 46. With respect to the binary "1's" in the information addresses, on the other hand, the primary magnetizations in the conductors 45 will have similarly directed slave magnetizations in the magnetic elements 46.

The information thus described as being contained in $x_3$ row of the array is subsequently read out in a read phase of operation $\Phi_4$. At this time the switch 51 is moved to its $r$ position and a read current pulse is applied therethrough to the circuit $48_3$ from the read current pulse source 53. This pulse, which is positive going, is of a magnitude sufficient to generate a magnetic field which alone will cause a switching of a slave magnetization in the magnetic elements 46 but will leave the primary magnetizations magnetically undisturbed. The polarity is selected so as to switch the slave magnetizations in any case, whether a binary "1" or a binary "0" is being stored. The effect of the read field, however, will be different in the two cases. As was previously described in detail, the read field operating upon the slave magnetization will be either augmented or opposed by the field of the primary magnetization depending upon the character of the information bit stored. Noting that the fields of the controlling static primary magnetizations are opposite in direction to that of the representative arrows $d$ and $d'$, the foregoing will become clear from an inspection of FIG. 5. The slave magnetizations after read out, represented graphically by the arrows $g$ and $g'$, may there be compared with the slave magnetizations $e$ and $e'$ after the write operation.

As a result of the magnetic switching at the information addresses of row $x_3$ during the read phase $\Phi_4$, output voltage signals will be generated across the elements 46. These signals will obviously vary in wave form depending upon the character of the stored bit as the result of the different interactions of the static and applied fields. Since for a binary "1" the fields aid, a larger output signal will appear across the elements 46 of the columns $y_2$ and $y_3$ than across the elements 46 of the columns $y_1$ and $y_n$ which latter elements are associated with conductors 46 of the rows in which the binary "0's" appear. Idealized output signals indicative of the information bits are represented for comparison in FIG. 5 as the wave forms $h$ and $h'$. The output signals indicating the binary word stored in the row $x_3$ are simultaneously transmitted to the information utilization circuits 50 in the conventional word organized read-out manner.

After the read phase $\Phi_4$ has been completed, the switch 51 is again moved to its $r$ position to initiate a final reset phase of operation $\Phi_5$. During this last phase of the operational cycle, another reset current is applied to the circuit $48_3$ of a magnitude and polarity identical to that described for the earlier reset phase $\Phi_3$. As a result, the slave magnetizations of each of the information addresses of row $x_3$ are restored to their normal reset directions. These are represented in FIG. 5 by arrows $j$ and $j'$.

A complete cycle of operation of one illustrative memory array shown in FIG. 4 has thus been described. The array may now be energized to repeat the same read-out operation from the same or other rows or new information may be introduced in any row in the manner described. Obviously, the array may be operated either selectively or sequentially as determined by the particular access circuitry employed.

What have been described are to be understood only as being illustrative embodiments according to the principles of this invention. Thus, the specific embodiments described are not to be understood as limiting the particular structural forms or modes of operation in which this invention may be practiced. Various and numerous other arrangements may accordingly be devised by one skilled in the art without departing from the spirit and scope of this invention.

What is claimed is:

1. A memory element comprising a first conducting wire having a helical magnetic flux path axially coincident therewith, said flux path being of a material having a substantially rectangular hysteresis characteristic and a first coercive force, means for inducing a magnetization in said flux path representative of a binary value, a magnetic second conducting wire having its axis parallel to the axis of said first conducting wire and being in inductive coupling with said last-mentioned wire so as to provide a return path for said magnetization, said magnetic second conducting wire having a second coercive force less than said first coercive force, means for switching magnetizations in said second wire, and means for detecting flux reversals in said second wire.

2. A memory element according to claim 1 in which said magnetic second conducting wire is disposed in physical contact with said first conducting wire.

3. A memory element according to claim 1 in which said magnetic second conducting wire is helically wound about said first conducting wire.

4. A memory element according to claim 1 in which said flux path has a first remanent flux capacity and said second wire has a second remanent flux capacity less than said first remanent flux capacity.

5. A memory element comprising a first conducting wire, a first helical magnetic flux path axially coincident with said first wire, said first flux path being of a material having substantially rectangular hysteresis characteristics and a first coercive force, means for inducing a magnetic flux in a segment of said first flux path representative of a binary value, a second conducting wire, and a second helical magnetic flux path axially coincident with said second wire, said second flux path being of a material having a second coercive force less than said first coercive force and being magnetically coupled to said first flux path so as to provide a return path for said induced magnetic flux.

6. A memory element according to claim 5 in which said first flux path also has a first remanent flux capacity and said second flux path has a second remanent flux capacity less than said first remanent flux capacity.

7. A memory element according to claim 6 also comprising means for switching induced fluxes in said second flux path and means for detecting voltage changes across said second conducting wire.

8. A memory element according to claim 7 in which said means for inducing a magnetic flux in said segment includes an energizing winding about both said first and said second conducting wires including said first and second flux paths.

9. A memory element according to claim 8 in which said means for switching said induced fluxes also includes said energizing winding.

10. A memory device comprising an electrical conductor, a first magnetic element helically wound about said conductor, said first magnetic element having substantially rectangular hysteresis characteristics and a first coercive force, a second magnetic element helically wound about said conductor alternately with said first magnetic element and being in magnetic proximity to said first magnetic element, said second magnetic element having a second coercive force less than said first coercive force, and write means for inducing a magnetization in said first magnetic element representative of a binary value.

11. A memory device according to claim 10 in which said first magnetic element also has a first saturation flux and said second magnetic element has a second saturation flux less than said first saturation flux.

12. A memory device according to claim 11 also comprising read-out means for switching magnetizations in said second magnetic element and means for detecting voltage changes across said electrical conductor.

13. A memory device according to claim 12 in which said write means includes a winding inductively coupled to said conductor and means for applying coincident write currents to said winding and said electrical conductor.

14. A memory device according to claim 13 in which said read-out means also includes said winding and further includes means for applying a read-out current pulse to said winding.

15. A memory device comprising a first magnetic element comprising a magnetic conductor having a first helical flux component in inductive relation therewith, said component having substantially rectangular hystereris characteristics and having a first coercive force and saturation flux, a second magnetic element comprising a second flux component helically wound on said first magnetic element, said second flux component having a second coercive force and saturation flux lower than said first coercive force and saturation flux, said second magnetic element being disposed in magnetic proximity to said first element such that a flux path is presented between said first helical flux component and said second magnetic element, means for inducing a first magnetic flux in said first helical flux component representative of an information bit, said first flux being closed through said flux path so as to induce a second magnetic flux in said second element, means for switching said second magnetic flux without switching said first flux, and means responsive to said switching of said second flux for generating an output signal representative of said information bit.

16. A memory device comprising a first helical magnetic component having substantially rectangular hysteresis characteristics and having a first coercive force, a second helical magnetic component having a second coercive force lower than said first coercive force disposed in magnetic proximitiy to said first magnetic component, means for applying a first field to said first component to induce a particular primary remanent magnetization therein and for establishing a slave magnetization in said second component, means for applying a read second field to said slave magnetization, and means responsive to flux excursions in said second component for generating an output signal of a character determined by whether the field of said primary magnetization aids or opposes said read field.

17. A memory device in accordance with claim 16 wherein said means for inducing said primary remanent magnetization in said first component and for establishing a slave magnetization in said second component comprises winding means coupled to said first and second components and a current source for applying current pulses to said winding means whereby the field of said primary magnetization establishes said slave magnetization.

18. A memory device in accordance with claim 16 wherein said means for inducing said primary remanent magnetization in said first component and for establishing said slave magnetization in said second component comprise first means including a first current source coupled to said first and second components for inducing said primary remanent magnetization and second means including a second current source for applying an external biasing field to said second component for establishing said slave magnetization.

19. A switching circuit comprising a plurality of first magnetic wires each having substantially rectangular hysteresis characteristics and a first coercive force, a plurality of second magnetic wires having a second coercive force lower than said first coercive force, each of said first and second wires having a preferred flux path axially coincident therewith, said plurality of second magnetic wires being magnetically coupled respectively to said plurality of first magnetic wires to provide a plurality of magnetic memory elements, a plurality of windings for each of said memory elements, a plurality of circuit means for connecting corresponding windings of said plurality of elements in series, marking means for inducing a particular magnetization in a segment of one of said first magnetic wires defined by one of said windings, the field of said particular magnetization inducing a second magnetization in the coupled second magnetic wire, means for applying an input switching current to the circuit means including said one winding to switch only said second magnetization in said coupled second wire, and means for detecting voltage changes across the ends of said coupled second wire.

20. A switching circuit as claimed in claim 19 in which the preferred flux path of each of said pluralities of first and second magnetic wires is helical.

21. A switching circuit as claimed in claim 20 in which said marking means comprises the circuit means including said one winding and means including a pulse source for applying coincident current pulses to said last-mentioned circuit means and said one of said first magnetic wires.

22. A crosspoint switching circuit comprising a plurality of electrical conductors each having a first and a second helical magnetic component axially coincident therewith, said first component having substantially rectangular hysteresis characteristics and a first coercive force and said second component having a second coercive force lower than said first coercive force, a plurality of windings for each of said conductors, a plurality of circuit means for serially connecting corresponding windings of said conductors, said conductors and said circuit means defining rows and columns of crosspoints, means for selectively applying coincident marking currents to a selected one of said circuit means and one of said conductors defining a particular crosspoint to induce a particular magnetization in the first magnetic component at said particular crosspoint, said particular magnetization inducing a second magnetization in the second magnetic component at said particular crosspoint, means for applying an input switching current to said selected circuit means to switch said second magnetization, and output circuit means connected to said selected conductor for generating an output signal responsive to the switching of said second magnetization.

23. In a coordinate array circuit arrangement, in combination, a plurality of first helical magnetic components, each having substantially rectangular hysteresis characteristics and each having a first coercive force, a plurality of second helical magnetic components, each having a second coercive force lower than said first coercive force, the first and second magnetic components of said pluralities of components being parallelly arranged and disposed respectively in magnetically coupled magnetic pairs, a plurality of conductor means inductively coupled to and parallel with respectively said coupled magnetic pairs to determine one set of coordinates of said array, a plurality of windings inductively coupled to each of said coupled pairs, and a plurality of circuit means for serially connecting corresponding windings of said pairs to determine the other set of coordinates of said array.

24. In a coordinate array circuit arrangement, the combination according to claim 23 in which each of said plurality of conductor means comprises a pair of conductors, one of said pair of conductors having one of said first helical magnetic components axially coincident therewith the other of said pair of conductors having one of said second helical magnetic components axially coincident therewith.

25. In a coordinate array circuit arrangement, the combination according to claim 23 in which each of said plurality of conductor means comprises a conductor having one of said second helical magnetic components wound therearound.

26. A memory matrix comprising a plurality of first helical magnetic components, each having substantially rectangular hysteresis characteristics and a first coercive force, a plurality of second helical magnetic components, each having a second coercive force less than said first coercive force, said pluralities of first and second components being inductively coupled respectively to each other to comprise a plurality of memory pairs, a plurality of first coordinate conductor means inductively coupled respectively to said plurality of memory pairs, a plurality of windings inductively coupled to each of said memory pairs defining a coordinate array of information addresses, a plurality of second coordinate circuit means for connecting corresponding windings of said memory pairs in series, means for selectively applying coincident current pulses to said conductor means and said circuit means for inducing a particular primary remanent magnetization in one of said first helical components at a particular information address representative of binary information, means for establishing a slave magnetization in the one of said second helical components including said particular information address, means for subsequently applying a current pulse to the circuit means defining said particular information address to apply a read magnetic field to said slave magnetization, and means responsive to magnetic changes in the said one of said second helical components for generating an output signal of a character determined by whether the field of said primary magnetization aids or opposes said read field.

27. A memory matrix according to claim 26 in which said means for establishing said slave magnetization in the said one of said second helical components comprises means for applying a biasing current to the winding defining said particular information address.

28. A memory element comprising a conducting first wire having a helical first preferred magnetic flux path established therein, at least said flux path being of a material having substantially rectangular hysteresis characteristics and having a first coercive force, means for inducing a magnetic flux in a segment of said first flux path representative of a binary value, a second wire having a flux path therein, at least said last-mentioned flux path being of a magnetic material having a second coercive force less than said first coercive force and being magnetically coupled to said first flux path so as to provide a return path for said induced magnetic flux, and interrogation means comprising means for switching magnetic flux in said return path and means for detecting flux switching in said return path.

29. A memory device comprising a first magnetic element presenting a first helical magnetic flux path, said element being of a material having substantially rectangular hysteresis characteristics and having a first coercive force, write means for inducing a magnetic flux in a segment of said first flux path representative of a binary value, a second magnetic element comprising a second helical magnetic flux path having its axis parallel with the axis of said first helical flux path, said second element being of a magnetic material having a second coercive force less than said first coercive force and being magnetically coupled to said first flux path so as to provide a return path for said induced magnetic flux, and interrogating means comprising means for switching magnetic flux in said return path and means for detecting flux switching in said return path.

30. A memory device according to claim 29 in which said write means includes a conducting wire having its axis coincident with the axis of said first helical magnetic flux path.

References Cited in the file of this patent

UNITED STATES PATENTS

| | | |
|---|---|---|
| 2,781,503 | Saunders | Feb. 12, 1957 |
| 2,872,667 | Mao Chao Chen | Feb. 3, 1959 |
| 2,920,317 | Mallery | Jan. 5, 1960 |

OTHER REFERENCES

"A New Storage Element Suitable for Large-Sized Memory Arrays—The Twistor," by Andrew H. Bobeck in "The Bell System Technical Journal," November 1957.